United States Patent

[11] 3,628,986

| [72] | Inventors | Marnell A. Segura;<br>Henry R. Savage; John L. Burroughs, all of Baton Rouge, La. |
|---|---|---|
| [21] | Appl. No. | 852,461 |
| [22] | Filed | Aug. 22, 1969 |
| [45] | Patented | Dec. 21, 1971 |
| [73] | Assignee | Esso Research and Engineering Company<br>Continuation-in-part of application Ser. No. 845,936, July 23, 1969, which is a continuation-in-part of application Ser. No. 591,124, Nov. 1, 1966. This application Aug. 22, 1969, Ser. No. 852,461 |

[54] WATER-REPELLENT REDUCED IRON ORE
15 Claims, No Drawings

[52] U.S. Cl. ............................................. 117/49,
117/100 M, 117/132 A, 117/135.1
[51] Int. Cl. ........................................... C23f 9/02,
B32b 15/02
[50] Field of Search ............................................. 117/132
BS, 132 A, 132 B, 100 M, 135.1, 49

[56] References Cited
UNITED STATES PATENTS

| 2,507,200 | 5/1950 | Elliott et al. ................. | 117/139.5 X |
| 2,635,060 | 4/1953 | Cheronis et al. ............. | 260/827 X |
| 2,655,489 | 10/1953 | Lawson ........................ | 117/132 UX |
| 2,744,040 | 5/1956 | Altmann ....................... | 117/100 UX |
| 3,185,589 | 5/1956 | Damm .......................... | 117/100 |
| 3,279,936 | 10/1966 | Forestek ....................... | 117/49 X |
| 3,401,051 | 9/1968 | Bordenca ..................... | 117/100 |
| 3,420,695 | 1/1969 | Rice et al. ..................... | 117/100 |

FOREIGN PATENTS

| 1,084,104 | 6/1960 | Germany ...................... | 117/100 |
| 1,229,343 | 2/1961 | France ......................... | 117/100 |

*Primary Examiner*—William D. Martin
*Assistant Examiner*—Harry J. Gwinnell
*Attorneys*—Manahan and Wright and Jay Simon

ABSTRACT: Reduced iron ore, which is water absorbent, is rendered substantially water repellent by treating with a liquid mixture comprising polymerizable silicones, a hydrophobic organic compound containing a polar carbon to oxygen bond and, optionally, polymerizable olefins; the treated iron being suitable for use in steel making processes.

WATER-REPELLENT REDUCED IRON ORE

CROSS-REFERENCE

This application-in-part of copending Ser. No. 845,936, filed July 23, 1969, which in turn is a continuation-in-part of copending Ser. No. 591,124, filed Nov. 1, 1966.

FIELD OF THE INVENTION

This invention relates to a process for rendering metallic iron water repellent and passive and to the water repellent and passive articles produced thereby. More particularly this invention relates to a process for treating powdered reduced iron ore or compactions of such powder with a liquid mixture comprising (i) a polymerizable silicone, (ii) a hydrophobic organic compound, particularly a hydrocarbon compound, containing a polar carbon to oxygen bond, and optionally, also containing (iii) a polymerizable hydrocarbon olefin.

BACKGROUND OF THE INVENTION

The preparation of metallic iron in forms which expose very high surface areas is well known. Typical of such processes and the high surface area metallic iron produced thereby is the direct reduction of iron ores, especially the fluidized direct reduction process. In such a process, oxidic iron ores in particulate forms ranging from less than about 1,000 microns and averaging about 50 to 400 microns in diameter are reduced at high temperatures, e.g. 900°–1,800° F., with reducing gases, e.g., CO and/or $H_2$. The particulate ore is maintained in a fluidized condition by direct contact with the reducing gases or separate fluidizing gases. One or more reduction zones may be employed for the reduction, each zone having its own fluidized bed. For example, hematite, an ore consisting principally of ferric oxide is charged to a first fluidized bed or beds and contacted with reducing gases to form magnetite, i.e., the magnetic oxide of iron. In subsequent reducing zones, the magnitite is further reduced, in fluidized beds, to ferrous oxide or wustite. The wustite is then reduced in a like manner to a product containing from about 80 to 95 percent metallic iron.

Due to the reduction process, the metallic iron not only is in a finely divided form but has a relatively high surface area. Consequently, the material is chemically quite active and subject to reoxidation or back oxidation in normal atmospheres. More importantly, however, the material has a pronounced tendency to absorb moisture and liberate hydrogen. Hydrogen liberation can be quite hazardous, particularly in confined areas. Needless to say, back oxidation and moisture absorption severely degrade the material and can prevent its use in steel making processes.

It has been proposed, therefore, to treat the surface of the reduced metallic iron so as to render it less susceptible to moisture absorption and back oxidation. (Methods such as compressing, compacting, or pelletizing the reduced iron to reduce the exposed surface area have not proved successful or economic, i.e., unless extraordinarily high temperatures and pressures are utilized, the resulting compactions are generally quite porous and can have porosities ranging up to 30 percent and higher. The porous surface is then subject to the same drawbacks as the powder. In any event, it is sometimes desirable to handle the reduced iron in a compacted form rather than as fines or powder and this invention applies equally to the treatment of powders or compacted forms.) A coating, to be truly satisfactory, should possess each of the following properties in a high degree: ability to render the surface water repellent; good weatherability, i.e., the maintenance of water repellency over a period of time while exposed to normal atmospheres; low cost; good product appearance; and a low concentration of flammable materials.

One method for treating the surface of the reduced iron to render it passive and water repellent is dipping or spraying the particles with a polymerizable olefin mixture, e.g., comprising olefins, diolefins, polyolefins, dimers, trimers, tetramers, and polymerizing the olefins to form a discontinuous hydrophobic film on the surface of the iron. While this treatment is relatively economic, it is usually necessary to use relatively high coating levels in order to achieve adequate passivation and water repellency. At such levels, however, the use of the coated iron in steel making processes may be objectionable, i.e., due to excessive flame and/or smoke emitted due to the combustion of the polymer.

Another proposed coating is the treatment of the iron with a polymerizable silicone. While excellent water repellency and weatherability can be obtained in this way, the cost of the silicone is relatively high and its use is uneconomic. Blending of the silicone and the polymerizable olefin has achieved some success in meeting the mentioned criteria. However, it has now been found that the olefin polymer level can be either reduced significantly or eliminated entirely without deleteriously affecting either the quality or the cost of the treated article by replacing all or a portion of the polymerizable olefin previously used with a simple hydrophobic compound.

SUMMARY OF THE INVENTION

In accordance with this invention, therefore, reduced metallic iron, whether in powdered or compacted form, may be rendered substantially water repellent and passive by treating with a liquid mixture comprising (i) a polymerizable silicone, (ii) a hydrophobic organic compound, preferably having a hydrophobic hydrocarbon moiety and containing a polar carbon to oxygen bond, e.g., alcohols, esters, aldehydes, carboxylic acids, the silicone being subsequently polymerized while the hydrophobic compound tends to react with oxygen on the surface of the iron. The resulting films or coating can be described as a discontinuous, hydrophobic deposit which renders the iron particles water repellent and resistant to back oxidation, i.e., passive. Optionally, and preferably, the treating liquid may also contain a polymerizable olefin which tends to increase the degree of passivation and water repellency of the surface coating.

Generally, the silicone portion of the liquid treating mixture may comprise from about 0.05 to about 3 percent by weight based on total liquid, preferably about 0.1 to 1.0 weight percent, more preferably 0.1 to 0.25 weight percent, the hydrophobic compound comprising about 97 to 99.5 weight percent. When a polymerizable olefin is employed, the concentrations of this material can range from about 10 to 50 weight percent, preferably 20 to 40 weight percent, all of which reduces the concentration of the hydrophobic compound, the silicone concentrations remaining constant. The effect of utilizing the basic two component or optional three component mixture is to reduce or eliminate the amount of olefin polymer formed on the reduced iron surface so as to reduce the smoke forming tendency of this material, while at the same time reducing the amount of silicone required, thereby lowering the cost of the coating.

In a highly preferred embodiment of this invention, the reduced iron surface contains some oxygen, generally in the form of iron oxide. The presence of the oxide facilitates the water repellent action of the hydrophobic material by permitting that material to presumably bond to the surface, i.e., by actual chemical bonding and/or by hydrogen bonding. Only a very small amount of oxide is necessary, e.g., at least about 0.5 percent, preferably about 0.5–5 percent, and more preferably 1 to 2 percent, and the overall quality of the reduced iron particle is not deleteriously affected. The oxide may be produced by simple exposure to normal atmospheres, but is preferably the result of a prior passivation treatment wherein hot (600° – 1300° F.) reduced iron is treated with air and/or moisture thereby partially passivating the material and permitting further handling of a less active material. The passivating technique utilized can be that described in U.S. Pat. No. 3,479,232 which is hereby incorporated by reference.

Any type of active iron surface can be treated in accordance with this invention. It is preferred, however, to use powdered reduced iron ores of sizes conventionally produced in fluidized ore reduction processes. Additionally, briquettes, pellets or other porous compactions of reduced iron ore particles can also be used. The passivating treatment is particularly advantageous for use with porous compactions having porosities above about 10 to 15 percent since it is at these levels that back oxidation and moisture absorption are especially acute.

Silicones suitable for use in accordance with the present invention can be either oil-soluble or water-soluble and may be illustrated by such dimetallo-substituted organo silane diols characterized by the formula:

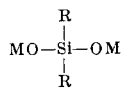

or, more accurately:

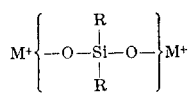

wherein R is the same or different and is hydrogen or a monovalent organo radical, or hydrocarbyl radical, such as alkyl, aryl, aralkyl, alkaryl or the like, whether substituted or unsubstituted, preferably a $C_1$–$C_6$ alkyl or aryl radical, e.g., methyl, ethyl, propyl, butyl, phenyl; and M is Group I or alkali metal of the Periodic Chart of the Elements, preferably lithium, sodium, or potassium. The oil soluble silicones are believed to have an R in excess of $C_6$ for alkyls (e.g., up to about $C_{20}$) and oil soluble hydrocarbon radicals generally.

Such silicones can be formed by the reaction between organo silane diols and alkali metal hydroxides, e.g., by reaction between dimethyl silane diol and sodium hydroxide, the reaction generally being effected in solution.

It is believed that the silicones of this invention cure or polymerize by reaction with water, e.g., by exposure to moist air for about 1–24 hours, preferably 3–10 hours at ambient to 200° F., and carbon dioxide in a manner similar to the reaction of silanols, which condense to form polysiloxane. Thus, in the presence of water, or in a water solution $(CH_3)_2Si(ONa)_2$ becomes ionized, as represented by the following;

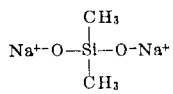

The individual molecules can react in accordance with the following:

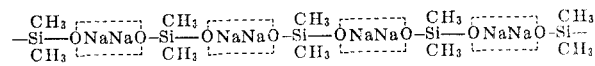

The liberated sodium oxide, $Na_2O$, reacts with carbon dioxide, $CO_2$, to form an aqueous solution of sodium carbonate, $Na_2CO_3$. The liberated $(CH_3)_2SiO^=$ moieties link together to form polysiloxane, having more than three repeating units, as represented by the following formula: $+(CH_3)_2SiO+_n$ wherein $n$ is an integer ranging generally from about 3 to about 20, preferably from about 5 to about 10.

In order to form these repeating units — viz $(CH_3)_2SiO^=$, it is necessary that the silicone compound be difunctional in its reaction. Thus, it is essential that not less than two alkali metal atoms of the molecule be bonded, each through an oxygen atom, to silicon. A monofunctional molecule is not capable of propagating a sufficiently long polymeric chain. A greater number of functional groups produces cross-linking.

Exemplary of silicone monomers suitable in accordance with the present invention are sodium methyl siliconate $(CH_3)_2Si(ONa)_2$, lithium ethyl siliconate $(C_2H_5)_2Si(OLi)_2$, potassium n-isobutyl siliconate $(C_4H_9)_2Si(OK)_2$, sodium phenyl siliconate $(C_6H_5)_2Si(ONa)_2$, and the like, as well as those silicones that meet Federal Specification 55-W-00110 (GSA-RSS) and may be purchased as methyl silicone resins dissolved in a stoddard solvent or water under the trade names of Dow Corning No. 773 and Dow Corning No. 772 respectively.

The hydrophobic compound utilized herein is preferably one that has a water insoluble hydrocarbon group. The water repellent effect of the compound is believed to be provided by the ability of the compound to react, either chemically or through hydrogen bonding, e.g., via a labile or weakly ionizable hydrogen atom. Examples of such materials are: primary, secondary or tertiary open chain or cyclic substituted or unsubstituted alcohols or phenols, e.g., $C_6$ to $C_{20}$ alcohols or phenols, preferably $C_8$ to $C_{13}$ alcohols or phenols; aldehydes, e.g., $C_6$ to $C_{20}$ alkyl or aryl aldehydes, preferably $C_8$ to $C_{13}$ aldehydes; esters, e.g., $C_6$ to $C_{20}$ esters having alkyl or aryl substituents, preferably $C_8$ to $C_{13}$ esters wherein at least one of the hydrocarbyl radicals is hydrophobic; $C_6$ to $C_{20}$ alkyl or aryl carboxylic acids, preferably $C_8$ to $C_{13}$ acids; and $C_6$–$C_{20}$ ethers both acyclic and cyclic where alkyl and aryl groups are present, and mixtures of any two or more of the foregoing. Typical examples of such materials are: hexyl alcohol, nonyl alcohol, isononyl alcohol, decyl alcohol, lauryl alcohol, myristyl alcohol, hexadecyl alcohol, cyclooctanol, cyclododecanol, caproic acid, caprylic acid, capric acid, lauric acid, stearic acid, oleic acid, linoleic acid, heptaldehyde, ethyl stearate, propyl caprylate, and the like, phenol, benzaldehyde, benzoic acid. The alcohols and aldehydes are most preferred, the alcohols being particularly preferred.

An excellent source of the materials usable as the hydrophobic compound is the well known oxo reaction. Essentially, the oxo reaction involves the reaction of an olefin with synthesis gas $(CO+H_2)$ at high pressures, e.g. 500–3000 p.s.i.g., and temperatures, e.g., 150° to 500° F., in the presence of a catalyst, e.g., dicobalt octacarbonyl, to produce alcohols and/or aldehydes having one more carbon atom than the feed olefin, i.e., a $C_n$ olefin is converted to a $C_{n+1}$ aldehyde and/or alcohol. Generally, the products of the oxy reaction are also quite useful in other chemical reactions and may not be available for use as a coating component. However, in the separation process where the oxo products, e.g., $C_{n+1}$ alcohols and aldehydes, are recovered, a relatively useless oxo bottoms product is formed. The oxo bottoms will generally be comprised of $C_{n+1}$ and $C_{n+1}$ alcohols, and heavy ends, i.e., $C_{n+2}$, alcohols, dimer alcohols, esters, and ethers. A typical analysis of a $C_8$ oxo bottoms fraction may be: 7–18 percent $C_8$ alcohols, 5–13 percent $C_9$ alcohols and 69–88 percent heavy ends, e.g., $C_{10}$ alcohols, $C_{16}$ alcohols, $C_{18}$ alcohols, ethers, and esters; an initial distillation point of 187°–199° C., 5 percent at 197°–204° C., 50 percent at 274°–293° C., and 95 percent at 371°–394° C.; specific gravity of 0.846–0.852 and a hydroxyl number of 125–200. These oxo bottoms fractions in the carbon number range given above for alcohols are preferred hydrophobic components.

As previously mentioned, it is believed that a discontinuous hydrophobic film forms on the surface of the reduced iron. The film is believed to be discontinuous since the amount and concentration of active materials used herein is not generally sufficient to form a continuous film. The hydrophobic compound, in contrast to the polymerizable silicones and olefins, is believed to chemically react at the surface of the reduced iron. Thus, it is believed that the pores on the surface of the iron are particularly vulnerable to water absorption (i.e., moisture does not tend to wet a nonporous iron surface). Further, it is believed that the hydrophobic compound preferentially reacts at the site of these pores to provide a protective coating at these sites.

The normally liquid olefin hydrocarbons suitable for use in the present invention comprise polymerizable acyclic and cyclic olefins, diolefins, triolefins, especially dimers, trimers, and tetramers of such olefins. Especially suitable are olefin admixtures of such compounds which contain dimers, trimers, and tetramers of cyclopolyenes and cyclodienes. For best results, the hydrocarbon admixture should contain from at least about 2 percent, preferably about 2 percent to about 15 percent, and more preferably from about 5 percent to about 10 percent polyenes or dienes, or both, based on the total weight of olefins in admixture. Preferably, the dienes are cyclodienes. Suitable hydrocarbon mixtures can be formed by admixing commercial products and residuals. For example, suitable olefinic liquid hydrocarbon mixtures can be obtained by admixing polyenes or dienes, or both, with commercially available olefinic liquid hydrocarbons such as obtained by steam cracking naphthas to obtain olefinic mixtures, which are then partially polymerized over hot clay. The source of polyenes or dienes, itself, can also be a commercial mixture. The resultant olefinic hydrocarbon mixture employed consists generally of olefins, diolefins, polyolefins, dimers, trimers, tetramers, and the like, of average carbon number ranging from about $C_{20}$ to about $C_{60}$, and more particularly from about $C_{30}$ to about $C_{45}$.

The viscosity of the liquid olefin hydrocarbon mixture preferably ranges from about 100 SSU (ASTM D-8-53) to about 250 SSU, and preferably from about 150 SSU to about 230 SSU, and can be readily controlled, if desired, by incorporation of solvents. The liquid olefin hydrocarbon is readily soluble in aromatic, paraffinic, and chlorinated hydrocarbons, acetates, ketones and relatively high molecular weight alcohols. Dialkyl sulfoxides, e.g., dimethyl sulfoxide, have been found particularly useful as solvents, penetration of the olefin hydrocarbons into the pores and crevices of the metals being achieved quite rapidly and efficiently. Driers can also be added, if desired. Suitable driers are, e.g., iron tallate, iron naphthanate, iron oxide, manganese oxide, and the like.

The conditions under which the reduced iron is contacted with the mixture are not critical and may vary widely. It is only essential that the coating mixture be liquid and sufficiently mobile to coat the surface of the iron and form a water repellent barrier over any pores and/or crevices on the surface. Thus, the coating process will normally be an in-line process, e.g. the fine particles can be removed from the fluidized zones, preferably given an initial passivation treatment as they cool, the passivation either followed by or preceded by a briquetting or compacting operation, and then water proofed and finally passivated. In this manner, the heat of the process can be advantageously utilized to liquefy the treating mixture, lower its viscosity, enhance the reaction of the hydrophobic material, and polymerize the olefin material. Under these conditions, the temperature of the metal surface will generally range from about 300° to 700° F., preferably 400° to 600° F. The temperature of the treating liquid preferably can range from about 80° to 200° F., preferably below about 150° F. Higher liquid temperatures can be used but these result in excessive vaporization losses. Temperatures below 80° F. are not preferred in that the liquid becomes excessively viscous.

Application of the liquid may be by dipping or spraying or any suitably liquid-solids contacting means. Contact time will, to some extent, depend on the temperature of the materials; but, in general, coating thickness will increase with increasing contact time and decreasing temperature. Contact times of about 2 to 30 seconds, preferably 5 to 20 seconds have been found suitable. After contact, a short period, e.g., 10 to 30 seconds, should be allowed for drainage.

When the olefin is utilized, some polymerization of the olefin will be effected during the contact period and over a sufficient period of time will be completed. However, the olefin can be polymerized easily in about 5 to 60 minutes, preferably 15 to 45 minutes by contacting with air above about 50° F., preferably 50° to 300° F., more preferably about 70° to 200° F.

Polymerization of the olefin lends an immediate water repellency to the coating. However, this factor along will not give good weatherability. The reaction of the hydrophobic compound at the surface will also give some immediate weatherability protection but the polymerization of the silicone, i.e., by exposure to moisture and/or carbon dioxide, gives the essential long term weatherability protection.

A suitable commercial mixture of liquid olefin hydrocarbons is one obtained by steam cracking naphthas to obtain, after removal of unreacted naphtha and cyclopentadiene, an olefinic mixture of average carbon number ranging $C_5$ to $C_{7+}$, or $C_5$ to $C_{20}$, and higher. This mixture is partially polymerized by contact at elevated temperatures, e.g., from about 250° to about 350° F., with a low volatile matter acid clay (Attapulgus) to form olefins of average carbon number ranging from about $C_{20}$ to $C_{80}$, and preferably from about $C_{30}$ to about $C_{45}$. The mixture contains largely acyclic olefins, viz, monoolefins and diolefins, dimers, trimers, tetramers, and the like. While the mixture contains some cycloolefins, i.e., from about 1–3 percent by weight, the addition of cyclopolyenes and cyclodienes greatly enhances the utility of the stream for use in the process of this invention. Suitably from about 4 to about 7 percent by weight of additional cyclopolyenes is added to the mixture to form a mixture ranging from about 7–10 percent cyclopolyenes and cyclodienes. The mixture is heat-reactive and, because of the highly unsaturated character of the mixture (Iodine Number 220–255), it dries and cures on the metal surfaces to form resinous deposits within the capillary pores and crevices by both oxidation and polymerization.

In the early or initial withdrawal of the metals from the reduction reaction zones, the metals are normally first cooled from reduction temperatures by contact with inert gases, mild reducing or oxidizing gases, a spray of water or steam, and cooled to immersion, dip or contact temperature. In accordance with another preferred embodiment, metallic iron from a direct iron ore reduction process can be simultaneously quenched and moisture-proofed. Thus, briquettes or iron powder, at reduction temperature ranging from about 1,000° to about 1,800° F., and preferably from about 1,000° to about 1,400°F., can be contacted with an aqueous emulsion or dispersion of the treating mixture. Oil-in-water or water-in-oil emulsions are satisfactory. Such emulsions are formed by admixing from about 20 percent to about 80 percent, and preferably from about 40 to about 60 percent, of the treating mixture with water or other aqueous media, based on the weight of the emulsion. The hot metallic iron is then dipped, sprayed or otherwise contacted with the emulsion at very short contact times, ranging from about 0.5 second to about 30 seconds, and preferably from about 1 second to about 10 seconds, to reduce the temperature of the metal to below about 600° F., and preferably below about 500° F., after which time the metal surfaces are drained of excess liquid and further cooled and if olefin is utilized, cured by contact with ambient air, or by natural or forced air circulation.

Additionally, even particulate metal or powders, containing carbon in concentrations ranging from about 1 percent to as high as 8 percent or more can be effectively moisture-proofed, and then compacted or pressed into briquettes which are substantially moisture-proof. Heretofore, briquettes formed from such high carbon content powders were too porous for practical use, unless larger quantities of coating material were used.

The article produced by the process described hereinabove can be either a coated powder or a coated briquette (or other compacted form) wherein the coating makes up about 0.05 to 0.5 weight percent based on iron, preferably about 0.1 to 0.3 weight percent. The silicone concentration of this coating will range from about 0.5 to 3.0 weight percent, preferably 1 to 2 weight percent.

In a typical illustration, a reduced iron product is obtained by charging a raw material hematite ore to the top or initial zone of a reactor containing a series of four fluidized beds. The ore is progressively reduced, upon descent from one bed to the next by treatment with an ascending gaseous mixture of hydrogen at temperature ranging from 1,400° F. in the top zone to 1,500° F. in the lowest fluidized zone. The particulate reduced iron product of 95 percent metallization is withdrawn from the final zone at about 1,430° F. The powder can then be partially passivated by treatment with air or moisture and subsequently either coated or compacted into briquettes of 3-⅝ × 2-¼ × 1-⅝ inches.

Table II shows the results of dipping briquettes in various treating liquids. The oxo bottoms referred to are a C₁₀ oxo bottoms fraction. The olefin polymer had the properties shown in table I. The silicone was an oil soluble silicone identified as Dow Corning No. 773 and had the following properties:

| | |
|---|---|
| Viscosity at 77° F. | 3.0 centipoise |
| Specific Gravity | 8.65 |
| Flash Point (closed cup) | 115° F. |
| % Silicone solids | 33% |

TABLE I

| | |
|---|---|
| Average Carbon Number | $C_{20}$–$C_{33}$ |
| Cyclodienes, Wt. % | 7–10 |
| Gravity, API (ASTM D 287-55) | 10–13 |
| Viscosity, SSU at 210° F. (ASTM D 88-53) | 210–220 |
| Flash, COC, °F. (ASTM D 92-52) | 280 |
| Iodine Number, cg./g. (ASTM D 555-54) | 240–255 |
| Ash, Wt. % | 0.06 |
| Nonvolatile Matter, Wt. % (ASTM D 154-53) | 95 |
| Color, Gardner (1 g. Olefin in 67 ml. Water White Xylene) | 10 |
| Acid Number, mg. KOH/g. | 0.1 |
| Saponification Number, mg. KOH/g. | 3.18 |
| Surface Tension, dynes/cm. | 44.5 |
| Distillation at 10 mm. (ASTM D 1160), °F. | |
| IBP | 182 |
| 5% | 298 |
| 10% | 326 |
| 20% | 377 |
| 30% | 425 |
| 40% | 464 |
| 50% (Cracked) | 504 |

Performance in the weatherometer is considerably improved using the oil soluble silicone (cf. runs 2 and 4 with 1 and 3). Air reheated briquettes were more effectively coated than nitrogen reheated briquettes due to having more oxide on the surface (cf. runs 2, 4), while reduced briquettes are not so effectively coated (cf. runs 15 and 20 with runs 2 and 4). Good waterproofing was obtained with the three component system, regardless of whether briquettes were heated in air or nitrogen (cf. runs 16, 17, 21 et seq.). However, the oxide layer is preferred (cf. runs 11 and 16). Also, water repellency tends to increase with increased coating (cf. runs 26, 27 and run 28).

Another series of briquette tests were run with briquettes at 500°–600° F., 2 second dip time at room temperature. The polymer liquid, silicone and oxo bottoms are the same as that used above.

TABLE III

| Coating | Porosity | Coating pickup, wt. percent | Water pickup, 5 min. immersion | Remarks |
|---|---|---|---|---|
| Oxo bottoms plus 1% silicone | 22 | 0.10 | 0.54 | |
| Oxo bottoms, 10% polymer, 1% silicone | 22 | 0.28 | <0.05 | Rereduced. |
| Oxo bottoms, 5% polymer, 1% silicone | 21 | 0.18 | <0.05 | Do. |
| Do | 21 | 0.075 | <0.05 | Do.¹ |

¹ 175° F. bath temperature.

These results show that the three component mixture is preferred and that increased coating pickup is obtained at higher polymer liquid concentrations and lower bath temperatures.

What is claimed is:

1. A process for rendering reduced iron ore passive and water repellent which comprises contacting the iron surface with a liquid mixture consisting essentially of a hydrophobic organic compound selected from the group consisting of alcohols, aldehydes, carboxylic acids, esters, and mixtures of at least two of the foregoing, and from about 0.5 weight percent to about 3 weight percent of a polymerizable silicone selected from a group consisting of oil-soluble and water-soluble silicones, exposing the contacted iron surface to conditions sufficient to cause polymerization of the silicone and reaction of the hydrophobic compound with the surface of the iron and forming a discontinuous, hydrophobic deposit on the surface of the iron which renders the surface water repellent and passive.

2. The process of claim 1 wherein the silicone is represented by the generic formula

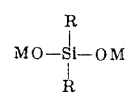

TABLE II

| Ref. No. | Bath composition, percent | | | | Briquettes | | Dipping conditions | | | Waterproofing | | | Coating pickup percent |
|---|---|---|---|---|---|---|---|---|---|---|---|---|---|
| | Decyl alcohol | Oil sol. silicone¹ | Oxo bottoms | Polymer liquid | Percent porosity | Rereduced⁵ | Bath temp., °F. | Briquette temp., °F. | Dip time, seconds | 5 minutes immersion, percent H₂O | Weatherometer⁶ | | |
| | | | | | | | | | | | Hours | Percent H₂O | |
| 1 | ²100 | | | | 25–30 | No³ | 75–100 | 600 | 10 | 0.0 | 210 | 0.81 | 0.017 |
| 2 | ²97 | 3 | | | 25–30 | No³ | 75–100 | 600 | 10 | 0.0 | 384 | 0.09 | 0.038 |
| 3 | ²90 | | | 10 | 25–30 | No³ | 75–100 | 600 | 10 | 0.0 | 384 | 0.51 | 0.070 |
| 4 | 97 | 3 | | | 25–30 | No | 75–100 | 600 | 10 | 0.015 | 384 | 0.19 | 0.10 |
| 11 | | 3 | ⁴87 | 10 | 20.6 | No | 75–100 | 600 | 2 | 0.023 | 576 | 0.24 | 0.07 |
| 15 | 97 | 3 | | | 22.4 | Yes | 75–100 | 600 | 2 | 0.71 | | | 0.15 |
| 16 | | 3 | ⁴87 | 10 | 22.1 | Yes | 75–100 | 600 | 2 | 0.02 | 192 | 0.18 | 0.28 |
| 17 | | 3 | ⁴92 | 5 | 20.8 | Yes | 75–100 | 600 | 2 | 0.0 | 72 | >0.25 | 0.18 |
| 20 | 97 | 3 | | | 21.7 | Yes | 75–100 | 600 | 2 | 0.56 | | | 0.18 |
| 21 | | 3 | ⁴92 | 5 | 20.5 | Yes | 175 | 600 | 2 | 0.0 | 120 | >0.25 | 0.08 |
| 26 | | 3 | 87 | 10 | 23.5 | Yes | 75–100 | 600 | 5 | 0.03 | 292 | 0.09 | 0.195 |
| 27 | | 3 | 87 | 10 | 23.7 | Yes | 175 | 600 | 5 | 0.04 | 292 | 0.10 | 0.17 |
| 28 | | 3 | 87 | 10 | 23.6 | Yes | 175 | 600 | 2 | 0.02 | 220 | 0.80 | 0.105 |
| 29 | | 3 | 82 | 15 | 24.3 | Yes | 175 | 600 | 5 | 0.0 | | | 0.193 |
| 30 | | 3 | 82 | 15 | 24.1 | Yes | 175 | 600 | 2 | 0.02 | | | 0.175 |
| 31 | | 3 | 82 | 15 | 24.5 | Yes | 175 | 600 | 10 | 0.02 | | | 0.29 |
| 32 | | 3 | 87 | 10 | 23.4 | Yes | 175 | (⁷) | 2 | 0.0 | 340 | 0.11 | 0.18 |
| 35 | | 3 | 82 | 15 | 23.2 | Yes | 75–100 | 700 | 2 | 0.0 | | | 0.10 |
| 39 | 2 | | 83 | 15 | | Yes | 75–100 | 600 | 5 | 0.02 | | | 0.19 |
| 46 | | 3 | 48.5 | 48.5 | | Yes | 150 | 600 | 5 | 0.0 | | | 0.25 |
| 49 | | 3 | 48.5 | 48.5 | | Yes | 150 | 500 | 5 | 0.0 | | | 0.34 |

¹ Dow Corning #773.
² 1-decanol (others are mixed isomers from oxo).
³ Air heated prior to dipping, others nitrogen reheated.
⁴ C¹⁰ bottoms, others are C⁸ bottoms.
⁵ Briquettes were rereduced in hydrogen.
⁶ ASTM D-822-57T; this test is indicative of long term weatherability.
⁷ Briquettes at 700° F., steamed 1 minute, then dipped.

wherein R may be the same or different and is selected from the group consisting of hydrogen and monovalent hydrocarbyl radicals, and M is a Group I metal of the Periodic Chart of the Elements.

3. A process for rendering chemically active iron surfaces passive and water repellent which comprises partially passivating the iron surface at a temperature of about 600°–1,300° F. such that at least about 0.5 percent oxygen is present on the surface of the iron in the form of iron oxide, then contacting the partially passivated iron surface with a liquid mixture comprising (i) a polymerizable silicone selected from the group consisting of oil soluble and water soluble silicones, the silicone being present in an amount ranging from about 0.5 to about 3 weight percent, based on total liquid, (ii) a polymerizable hydrocarbon olefin mixture having an average carbon number ranging from about $C_{20}$ to about $C_{60}$ and having about 2 to 15 weight percent, based on olefin, or polyenes, the olefin being present in an amount ranging from about 10 to about 50 weight percent, and (iii) a hydrophobic organic compound selected from the group consisting of $C_6$–$C_{20}$ alcohols, aldehydes, esters, carboxylic acids, and mixtures of at least two of the foregoing, polymerizing both the silicone and the olefin and reacting the hydrophobic compound with the partially passivated iron surface, and forming a discontinuous, hydrophobic film on the surface of the iron, thereby rendering the iron surface passive and water repellent.

4. A process for rendering reduced iron ore passive and water repellent which comprises contacting the iron surface with a liquid mixture consisting essentially of a hydrophobic organic compound, a polymerizable olefin mixture and from about 0.5 weight percent to about 3 weight percent of a polymerizable silicone, said hydrophobic organic compound being selected from the group consisting of alcohols, aldehydes, carboxylic acids, esters and mixtures of at least two of the foregoing, said polymerizable olefin mixture having an average carbon number in the range of about $C_{20}$–$C_{60}$ and containing at least about 2 percent polyenes based on total weight of olefins, and said polymerizable silicone being selected from the group consisting of oil soluble and water soluble silicones; and exposing the contacted iron surface to conditions sufficient to cause polymerization of the olefin mixture and silicone and reaction of the hydrophobic compound with the surface of the iron thereby forming a discontinuous hydrophobic deposit on the surface of the iron which renders the surface water repellent passive.

5. A process for rendering a chemically active iron surface passive to back oxidation and water repellent by forming a film thereon which is substantially impervious to moisture which comprises contacting the surface of the iron with a liquid mixture containing about 0.5 to about 3 weight percent of a polymerizable silicone, a polymerizable liquid olefin mixture, and a hydrophobic organic compound, said polymerizable silicone being selected from the group consisting of oil soluble and water soluble silicones, said polymerizable liquid olefin mixture having an average carbon number ranging from about $C_{20}$ to about $C_{60}$ and containing about 2 to 15 weight percent polyenes based on total olefin, and said hydrophobic organic compound being selected from the group consisting of alcohols, aldehydes, esters, carboxylic acids and mixtures of at least two of the foregoing; reacting the hydrophobic compound with the surface of the iron and polymerizing the silicone and olefin on the surface of the iron, and forming a film on the surface of the metal, thereby rendering the chemically active iron surface passive at water repellent.

6. A process for rendering a chemically active iron surface passive to back oxidation and water repellent by forming a film thereon which is substantially impervious to moisture which comprises contacting the surface of the iron with a liquid mixture containing about 0.5–3 weight percent of a polymerizable silicone selected from the group consisting of oil soluble and water soluble silicones and a hydrophobic organic compound selected from the group consisting of alcohol, aldehydes, esters, carboxylic acids and mixtures of at least two of the foregoing, reacting the hydrophobic compound with the surface of the iron and polymerizing the silicone, and forming a film on the surface of the metal, thereby rendering the chemically active iron surface passive and water repellent.

7. The process of claim 6 wherein the chemically active iron surface is partially passivated prior to contacting with the liquid mixture such that the surface contains a small amount of oxygen in the form of iron oxide.

8. The process of claim 6 wherein the temperature of the metal surface at the time of contacting ranges from about 300° to 700° F. and the temperature of the liquid mixture at the time of contacting ranges from about 80° to 200° F.

9. The process of claim 6 wherein the hydrophobic compound has a carbon number ranging from about 6 to 20.

10. The process of claim 6 wherein the hydrophobic compound is decyl alcohol.

11. The process of claim 6 wherein the hydrophobic compound comprises the oxo bottoms fraction from the oxonation of olefins.

12. The process of claim 6 wherein the silicone is represented by the generic formula

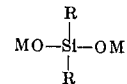

wherein R may be the same or different and is selected from the group consisting of hydrogen and monovalent hydrocarbyl radicals, and M is a Group I metal of the Periodic Chart of the Elements.

13. An article of manufacture comprising reduced iron metal particles coated with about 0.5 to about 5 weight percent, based on iron, or hydrophobic film comprising polymerized silicone, a hydrophobic compound and polymerized product of an olefin mixture, said polymerized silicone ranging from about 0.5 to about 3 weight percent, based on the coating, said hydrophobic compound being selected from the group consisting of alcohols, aldehydes, esters, carboxylic acids, and mixtures of at least two of the foregoing, and said polymerized product of an olefin mixture having an average carbon number ranging from about $C_{20}$ to about $C_{60}$ and containing at least 2 weight percent, based on olefin, of polyenes.

14. An article of manufacture comprising reduced iron metal particles coated with about 0.05 to about 5 weight percent, based on iron, of hydrophobic film comprising polymerized silicone and a hydrophobic compound selected from the group consisting of alcohols, aldehydes, esters, carboxylic acids, and mixtures of at least two of the foregoing, said polymerized silicone ranging from about 0.5 to about 3 weight percent based on the coating.

15. The article of claim 14 wherein the iron particles are in a compacted form.

* * * * *